July 24, 1934. L. E. LA BRIE 1,967,413

BRAKE

Filed Sept. 21, 1928

INVENTOR.
Ludger E. LaBrie
BY
ATTORNEY

Patented July 24, 1934

1,967,413

UNITED STATES PATENT OFFICE 1,967,413

BRAKE

Ludger E. La Brie, South Bend, Ind., assignor to Bendix Brake Company, South Bend, Ind., a corporation of Illinois Application September 21, 1928, Serial No. 307,457

9 Claims. (Cl. 188—250)

This invention relates to brakes, and is illustrated as embodied in the shoes, and their connections one to another, of a three-shoe type of internal expanding automotive brake. An object of the invention is to provide a light and inexpensive shoe which is yet strong enough for use in a heavy truck brake.

An important feature of the invention has to do with the fabrication of a shoe of box section construction, a novel reinforcing and stiffening web of U section being preferably welded to an arcuate rim band seated in recesses formed in laterally turned flanges of the U section.

Other features of novelty relate to a novel arrangement of three shoes of such construction wherein the central secondary shoe straddles, at its ends, the adjacent primary and auxiliary shoes, to a novel articulating pin bearing structure, comprising a spacer and two disks, secured to contiguous parts of the shoes and to other novel and desirable features of construction which will be apparent from the following description of one illustrative embodiment shown in the accompanying drawing, in which:

Figure 2 is a section taken on the line 2—2 of Figure 1 disclosing the bearing feature referred to;

Figure 1:
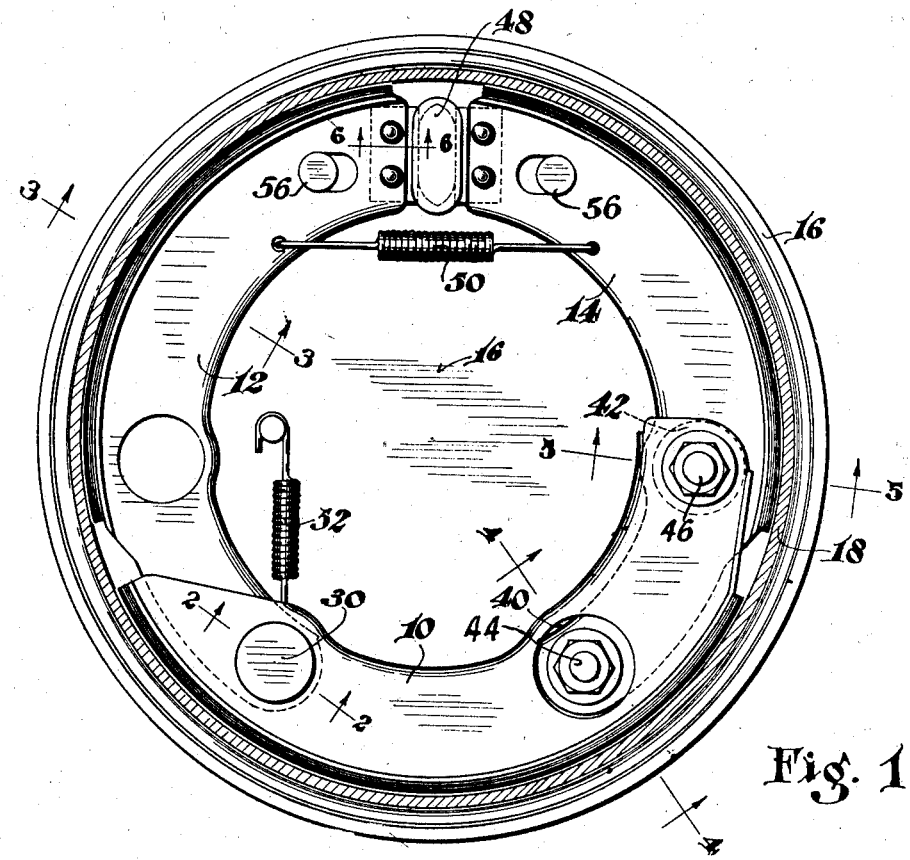
Figure 1 is a vertical section, taken just inside the head of the brake drum, and indicating in side elevation the brake including the features of my invention.
Figure 4:
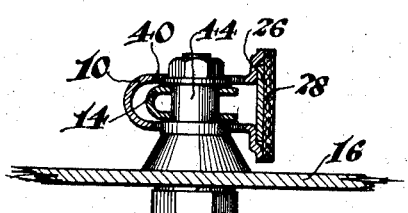
Figure 5:
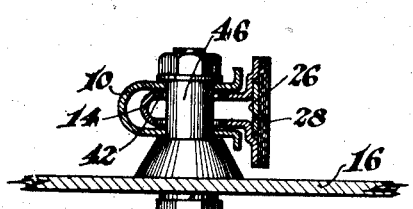
Figure 6:
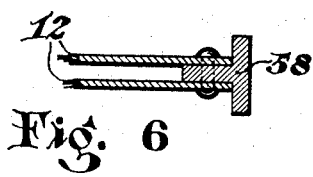

Figures 4 and 5 are sections taken on the lines 4—4 and 5—5 respectively of Figure 1 indicating the anchoring construction of the secondary and auxiliary shoes; and Figure 6 is a secton taken on the line 6—6 of Figure 1 indicating a novel thrust plate constructon at the shoe end.

The brake shown in Figure 1 includes the usual central or secondary shoe 10, a servo shoe 12 and the auxiliary shoe 14 all housed within and secured to the usual backing plate 16 to brake the usual revolving drum 18 suitably secured to the wheel body.

Shoes 12 and 14 are preferably identical in construction and therefore interchangeable.

Figure 3:
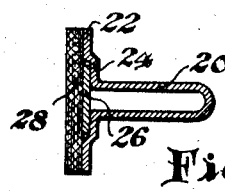
Figure 3 is a section taken on the line 3—3 of Figure 1 indicating my novel shoe construction.

According to an important feature of my invention each of the shoes may be fabricated from a channel U sectioned web portion 20, clearly disclosed in Figure 3, the same to be provided with outturned laterally extending flange 22 recessed at 24 to house a curved rim band portion 26 nested therein and preferably welded thereto. The band is preferably made flush with the flanges to present a smooth outer rim surface upon which the usual friction lining material 28 may be suitably secured.

Figure 2:
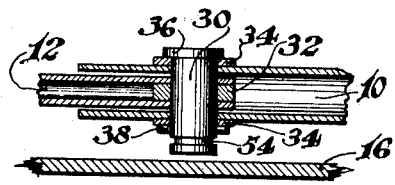

The channel of central shoe 10 is preferably somewhat wider than the remaining shoes and is consequently adapted to straddle the primary or servo shoe 12 at one of its ends as clearly indicated in Figure 2. As one feature of my invention I prefer to substantially increase the bearing surface for the articulating pin 30 connecting these shoes at the straddled area referred to by interposing a reinforcing spacer 32 between the ends of the servo shoe web and by providing disks 34, one on either side of the central shoe web. The bearing reinforcements thus provided may be secured to their contiguous shoe elements by welding and the assembly perforated to receive the pin which may be headed at 36 to contact one of the disks 34 and secured in place by a cotter pin 38.

As disclosed in Figures 4 and 5 the channel web portions of overlapped shoes 10 and 14 are preferably provided with relatively large openings 40 and 42 respectively to permit relative movement of the shoes in the braking operation, anchor pins 44 and 46 securing the shoes to the backing plate.

The shoes are expanded against the drum by a suitable double cam 48, arranged between the ends of shoes 12 and 14, against the resistance of return springs 50 and 52, the former being connected between the free ends of shoes 12 and 14 and the latter being connected at one end to the pin 30 at recess 54 therein and at its other end to the backing plate of the brake. Pins 56, suitably secured to the backing plate, are arranged to pass, one each through an elongated opening in each of the shoes 12 and 14 to determine the released or idle position of the braking elements. According to a minor but important feature of my invention, as disclosed in in Figure 6, I provide a novel cam thrust plate 58 of T-section with the stem of the T arranged between and suitably secured to the legs of the U-channel webs of the shoes.

A shoe structure is thus presented which is, by virtue of its box sectioned shape, very strong and substantial yet simply and cheaply formed from steel stampings. Three such shoes, assembled as described, provide a rigid and efficient brake, one fully capable of withstanding the severe requirements of both truck and bus brake service.

While but one embodiment of my invention has been illustrated and described in detail, it is not my intention to be limited thereby but only as far as may be indicated by the scope of the appended claims.

I claim:

1. A brake shoe having a stiffening web part of one piece U-section material provided with recessed laterally directed flanges at the outer edges of its side walls.

2. A brake shoe having a stiffening web part of one piece U-section material provided with recessed laterally directed flanges at the outer edges of its side walls, together with a cylindrical rim part seated within said recessed portion.

3. A brake shoe comprising, in combination, an outer arcuate band and a stiffening means for the band including two generally parallel spaced apart web portions, each web portion having a laterally directed recessed flange at its outer edge.

4. A brake shoe comprising, in combination, a channel section web member having laterally turned rabbeted flanges, together with an arcuate band seated within the rabbeted portions of the flanges to present with said flanges a smooth outer surface adapted to receive a friction material to be secured thereto.

5. A brake shoe comprising, in combination, an open channel sectioned web member, together with an arcuate band closing said channel to substantially define a box sectioned shoe structure, said channel sectioned web member extending at one end of the shoe beyond the extremity of said band defining a channel adapted to house one end of a juxtaposed shoe member.

6. A shoe comprising a channeled web and a rim part supported within and between the sides of the channel.

7. A shoe comprising a channel member, flanges on the channel member and a rim part supported between the flanges, the rim part and flanges jointly forming the outer face of the shoe.

8. A brake shoe comprising an integral pressed metal member having a central portion serving as a stiffening web, spaced outturned edge portions forming cylindrical brake lining receiving surfaces, and a second member fitted upon said member and bridging the space between the outturned edge portions.

9. A brake shoe comprising a pressed metal member bent to form a double strengthening web and spaced outturned cylindrical flanges, and a second member of less width than the over all width of the flanges bridging the space between the cylindrical flanges.

LUDGER E. LA BRIE.